United States Patent

Hong et al.

[11] Patent Number: 5,844,900
[45] Date of Patent: Dec. 1, 1998

[54] METHOD AND APPARATUS FOR OPTIMIZING A MEDIUM ACCESS CONTROL PROTOCOL

[75] Inventors: Hilton K. Hong, Fremont; Juan Grau, Jr., Redwood City; Arthur B. Coleman, Fremont, all of Calif.

[73] Assignee: Proxim, Inc., Mountain View, Calif.

[21] Appl. No.: 716,740

[22] Filed: Sep. 23, 1996

[51] Int. Cl.⁶ .................................................. H04B 7/216
[52] U.S. Cl. .......................................... 370/342; 370/347
[58] Field of Search ....................................... 370/320, 321,
 370/322, 329, 330, 337, 335, 341, 342,
 431, 465, 468, 347; 375/202, 203; 455/450–454

[56] References Cited

U.S. PATENT DOCUMENTS

| | | | |
|---|---|---|---|
| 4,980,886 | 12/1990 | Bernstein | 370/342 |
| 5,034,993 | 7/1991 | Sasuta et al. | 379/63 |
| 5,231,634 | 7/1993 | Giles et al. | |
| 5,583,869 | 12/1996 | Grube et al. | 370/347 |

*Primary Examiner*—Ajit Patel
*Attorney, Agent, or Firm*—Burns, Doane, Swecker & Mathis LLP

[57] ABSTRACT

The present invention is directed to providing a wireless medium access control protocol wherein throughput can be optimized as the communication system dynamically changes when nodes either join or leave the communication system.

5 Claims, 3 Drawing Sheets

FIG._4

METHOD AND APPARATUS FOR OPTIMIZING A MEDIUM ACCESS CONTROL PROTOCOL

BACKGROUND OF THE INVENTION

1. Field of the Invention

The present invention relates generally to communication among plural nodes, and more particularly, to control of wireless communications by adjusting a number of deferral and fairness slots.

2. State of the Art

Communication systems, such as local area networks (LANs), have achieved widespread use for the exchange of information. These systems include a plurality of data processing nodes, or "agents", which contend for access to a communication medium that interconnects the nodes.

For example, commonly assigned U.S. Pat. No. 5,231,634 (Giles et al), the disclosure of which is hereby incorporated by reference in its entirety, relates to a communications system wherein a predetermined number of deferral and fairness slots are used. In the communication system of the Giles patent, a plurality of nodes are used, each of which is equipped with a radio transceiver. The '634 patent describes medium access control of a wireless LAN to provide decentralized, peer-to-peer access for all of the agents. A peer-to-peer communication system is one in which all agents can freely communicate without any agent having an advantage over another.

Wireless communication systems require consideration of potential problems which do not exist in hardwired systems. For example, in a wireless communication system, the nodes can be mobile, moving in and out of range with other nodes in the system. The '634 patent is directed to continuously ensuring that all agents possess fair access to the communication system (i.e., to avoid, for example, agents which are physically closer to a given destination from having an unfair advantage due to their signal strength being greater than that of agents physically located further from the destination).

When using a wireless medium access protocol such as that described in the '634 patent, the number of deferral and fairness slots can significantly affect the amount of throughput in the system. In a system where a large number of wireless nodes are contending for medium access at the same time, a larger number of fairness and deferral slots is desired. In contrast, when only one or two wireless nodes are contending for medium access, fewer slots are desired. Thus, when a system is configured with a predetermined number of slots, the system may be optimized for operation with a given number of active nodes, yet be inefficient when that number of nodes is changed.

Accordingly, it would be desirable to provide a wireless medium access control protocol, which can be optimized for any number of nodes currently active in the communication system.

SUMMARY OF THE INVENTION

The present invention is directed to providing a wireless medium access control protocol wherein throughput can be optimized as the communication system dynamically changes when nodes either join or leave the communication system.

Generally speaking, exemplary embodiments of the present invention relate to an apparatus and method for controlling wireless communication among plural nodes in a communication system comprising: means for monitoring a number of transmissions which occur within the communication system; and means for dynamically changing a number of slots for which nodes of the communication system contend for access to a wireless communication medium of the communication system, said step of dynamically changing being performed as a function of said number of monitored transmissions.

BRIEF DESCRIPTION OF THE DRAWINGS

The present invention can be further understood with reference to the following description and the appended drawings, wherein like elements are provided with the same reference numerals. In the drawings.

DETAILED DESCRIPTION OF THE PREFERRED EMBODIMENTS

1. Overview

Figure 1:
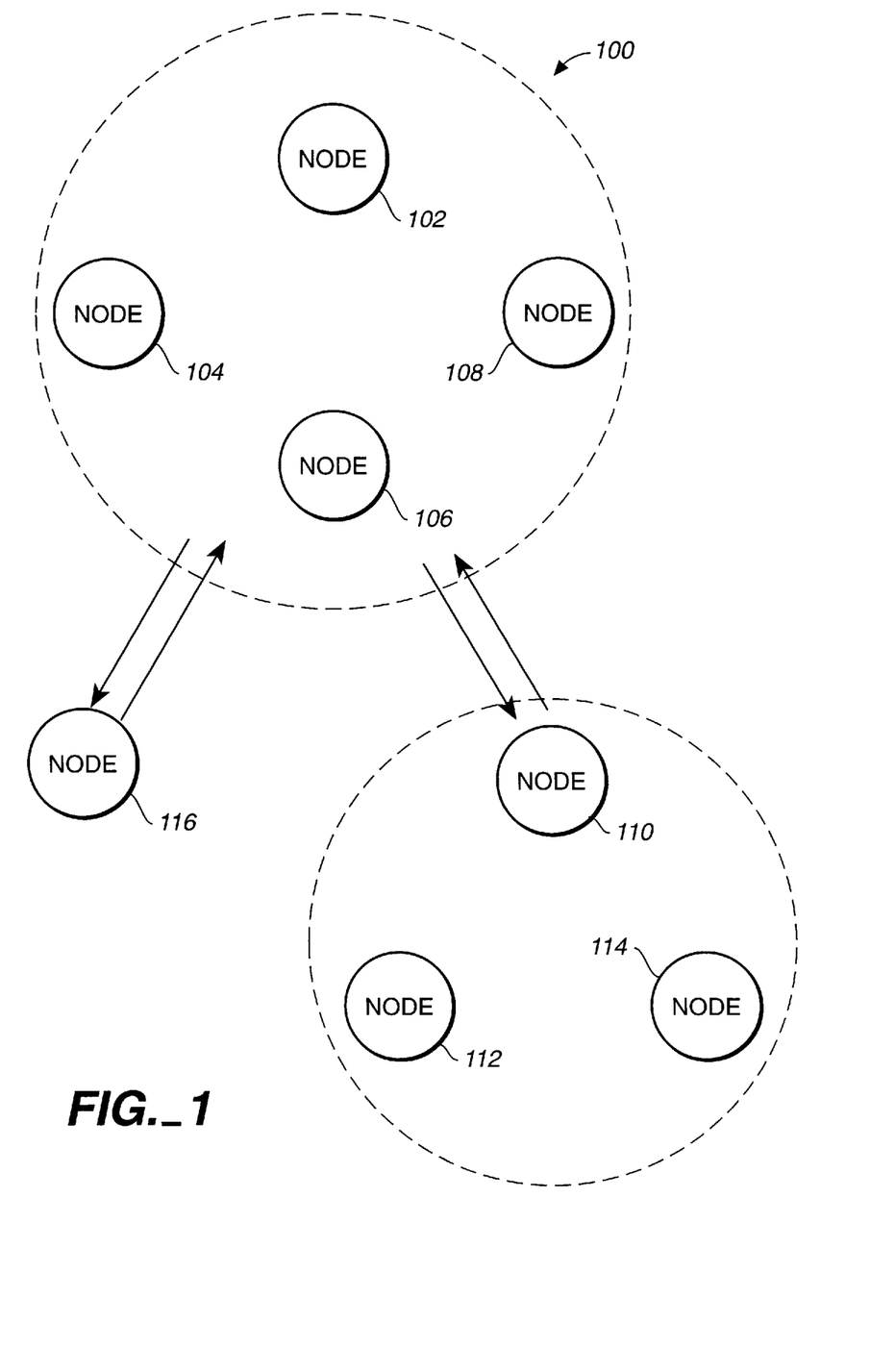
FIG. 1 illustrates a multiple master-node configuration for an exemplary communication system in accordance with the present invention.

FIG. 1 illustrates an exemplary embodiment of a communication system 100 for controlling communication of frequency hopped signals among a plurality of nodes 102–116 (e.g., communication stations). FIG. 1 is described in copending U.S. application Ser. No. 08/417,907 filed Apr. 6, 1995 entitled "Frequency Hopping Medium Access Control Protocol" by Hilton K. Hong et al (Attorney Docket No. 021775-029), and in U.S. application Ser. No. 08/717,762 entitled "Method and Apparatus for Managing Power in a Frequency Hopping Medium Access Control Protocol" by Hilton K. Hong et al., filed on even date herewith, the contents of which are hereby incorporated by reference in their entireties. However, to assist in understanding aspects of a medium access control optimization in accordance with exemplary embodiments of the present invention, an understanding of the use of a master station as described in the aforementioned copending application is helpful.

In FIG. 1, only nodes which are synchronized to one another can communicate with one another. A frequency hopping medium access protocol in accordance with the aforementioned copending applications can be used to control communication among the nodes in server based networks, peer-to-seer networks, ad hoc networks and so forth.

Frequency hopping within a communication system is performed by transmitting/receiving information using any number N of different frequencies (e.g., a prime number, such as 79 or 83 different frequencies). The communication system repeatedly switches frequencies during communication, sequencing through all N frequencies of the hop sequence. The frequencies are switched in either a random or a predetermined sequence (i.e., the hop sequence). A random sequence can be used if a mechanism is in place whereby both a transmitting node and a receiving node use the same random generation technique, or if the transmitter communicates the random sequence to the receiver.

The system remains at each of the different frequencies of the hop sequence for a selected period of time, referred to herein as the hop period. In accordance with exemplary embodiments, the hop period can be fixed at any one of a plurality of different time lengths. For example, in an exemplary embodiment the hop period can be selected to be 100 milliseconds (ms), 200 ms or 400 ms. The hop period is selected by the master node which is in control of synchronization of the communication system at a given time. Once the hop period is set by the master node, it will not vary unless the master node changes the hop period or the communication system resynchronizes to a new master node with a different hop period. All nodes which are synchronized to a particular master node recognize the hop period defined by that master node.

In accordance with the an exemplary embodiment, communication among the various nodes of the communication system is achieved by synchronizing these nodes to the same frequency within the hop sequence, and by aligning the hop periods so that all nodes in communication with one another switch frequencies together. In accordance with exemplary embodiments, synchronization is maintained continuously, and not only when a node attempts to initiate or receive communications. Thus, data and other information can be transmitted whenever the communication system is open (i.e., contention-free), without having to wait for a synchronization period to elapse.

In accordance with an exemplary embodiment, a decentralized, or distributed method of synchronization is used whereby any one of multiple nodes can control system synchronization and communication. Accordingly, each of nodes 102–116 in FIG. 1 is assigned a hierarchical designation representing a priority of the node to control synchronization of the communication system. The node which controls synchronization at a given time will be referred to hereafter as a "master node". Any remaining nodes which are in communication range of the master node can be synchronized to the master node. For example, node 102 of FIG. 1 can be considered a master node for controlling synchronization of the communication system. However, if node 102 is disconnected (e.g., a mobile communication station which leaves the building), the remaining nodes resolve which node will become the new master node.

In accordance with exemplary embodiments, each node is assigned a hierarchical designation representing a priority of the node in contending to become a master node. In an exemplary embodiment, the hierarchical designations are of three different types: (1) a designation of highest priority referred to herein as master station priority; (2) an intermediate priority designation referred to herein as an alternate master station priority which is of a priority lower than that of a master station priority; and (3) a lowest priority designation representing nodes which can never control synchronization.

In the above example, the "master node" can be a node of either master station priority or a node of alternate master station priority. Nodes of priority (3) cannot communicate within a communication system unless a master node is located within their range of communication to control synchronization. The nodes of the communication system resolve which node will be the master node for controlling synchronization within the system at any given time. As referenced herein, the phrase "communication system" refers to one or more nodes which can communicate with each other. Because the nodes are mobile, one or more dynamically reconfigured subsystems may exist within the communication system. For example, a first plurality of nodes may be within communication range of one another and controlled by a first master node. A second plurality of nodes within the communication system may be in communication with one another and controlled by a second master node. Depending on the priority assigned to each node, it is possible that a single node which can communicate with some of the first plurality of nodes and with some of the second plurality of nodes will attempt to become a master node. Whether the single node will be successful or not depends on master node resolution.

2. Communication Format a. Hop Period

Figure 2:
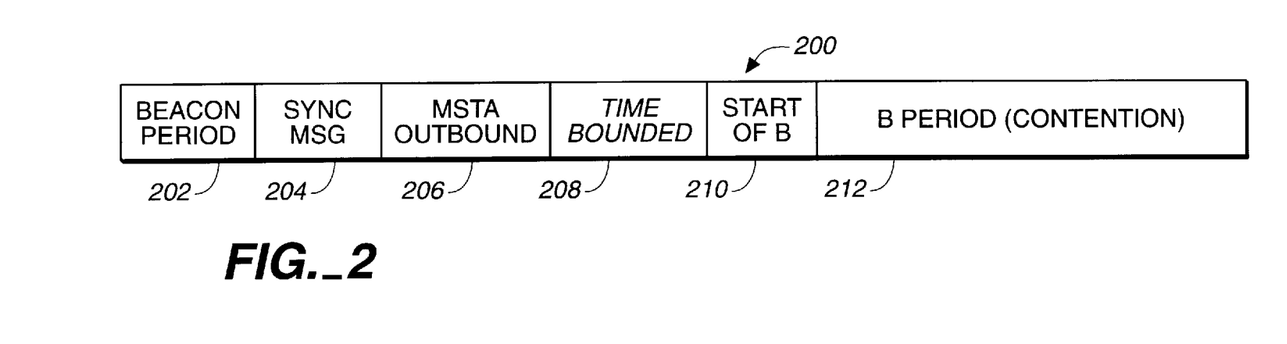
FIG. 2 shows a frequency hop period in accordance with an exemplary embodiment of the present invention.

FIG. 2 illustrates a time oriented relationship of an exemplary hop period 200 with the total time duration selected for the hop period being indicated in a synchronization message 204 (i.e., Sync MSG) from the master node. The phrase "hop period" can be abbreviated to "hop".

A master node controls synchronization of nodes in the communication system by transmitting the sync message. A beacon period is included in the hop period as an aid to facilitate synchronization. The beacon period permits faster synchronization of a node to a master node. A node receiving the beacon can lock onto the frequency of the beaconing master node prior to receipt of a sync message. Each of the sections set forth in the exemplary FIG. 2 hop will now be described.

(1) Beacon Period—The beacon period ensures that there is energy present at the current frequency (i.e., a beacon frequency) long enough for any receiver node to scan all possible frequencies in the hopping sequence. In addition, information is included in the beacon to allow a receiver, once it has detected energy in a particular frequency, to determine whether this beacon has the appropriate channel/subchannel information. To detect a beacon, nodes continuously sequence through all N frequencies of the frequency hopping sequence looking for a beacon transmitted by a master node. The master node sends the beacon for a long enough period of time to enable a node to scan all N frequencies during a scanning period. The length of time the master node sends the beacon to ensure that other nodes will have an opportunity to scan all N frequencies is the beacon period 202.

The beacon period 202 is a fixed duration, contention-free period of time during which a beacon message is broadcast by the master node. This feature ensures that a node of master station priority can immediately transmit information for establishing communication with other nodes of the communication system, without first monitoring the communication medium before transmitting such information. This avoids delays typically required for a node to transmit such information in, for example, a server-based communication system. The master node can be configured to beacon, for example, every 1 to 8 hops for the purpose of optimizing sync times versus overhead for a given installation.

One example of a beacon is a signal which includes the following sequence: a first delay period (i.e., Delay 1); a Preamble; a second delay period (i.e., Delay 2); and a beacon message. The four components of this sequence can be repeated any number of times, end-to-end, for an entire length of beacon period 202. Each of these four components can be described as follows:

| | |
|---|---|
| Delay 1 | This delay is the time it takes to change from switching to send a Beacon Message to the time it takes to send a Preamble message. |
| Preamble | The inclusion of a Preamble makes it easier for nodes to lock onto a particular master node (e.g., a waveform constructed to provide easy lock, which is appended to the start of a data packet). |
| Delay 2 | This is the time it takes to transition from sending a Preamble to sending a Beacon Message. |
| Beacon Msg. | A beacon message corresponds to a short data packet for telling other nodes (a) a channel at which the master node is operating; (b) a subchannel on which the master node is operating; and (c) at which frequency the master node is operating (i.e., which of the N frequencies). The beacon message is optimized for efficient searching by the remaining nodes. The Beacon Message can include, for example, 5 data bytes, 2 flag bytes, and 2 cyclic redundancy check (CRC) or checksum, bytes. Flag bytes represent framing bytes in between which data can be transmitted. |

The foregoing beacon sequence is by way of example only, and those skilled in the art will appreciate that any signal or sequence of signals can be used as the beacon. For example, the above beacon could be modified to exclude the preamble and/or the delays. The beacon could merely be an energy bearing signal for indicating to receivers that a sync message will follow.

An appropriate beacon period should be selected to account for any time a receiving node requires to prepare for reception of each frequency of the frequency hopping sequence (i.e., the radio period, or key-up time) and the time the receiver must listen at a frequency of the frequency hopping sequence to detect the beacon message (i.e., beacon listening time).

The radio key-up time can, in an exemplary embodiment, include the time required to receive a preamble within a beacon period. A worst case situation occurs when the preamble has just been missed by a receiving node such that the node must wait for a subsequent preamble to be sent. Thus, a minimum radio key-up time should correspond to a sum of two preambles, delay 2, a beacon message and delay 1.

A beacon listening time corresponds to an amount of time required for a node to listen at the frequency at which the preamble was detected during a scan through all N frequencies. The beacon listening time must be long enough to guarantee that a beacon message sent at that frequency will be detected. A worst case occurs when a node fails to detect a beacon message such that a receiver of the node must wait for a subsequent beacon message. Therefore, in an exemplary embodiment, a beacon listening time corresponds to a sum of two beacon messages, delay 1, delay 2 and 1 preamble.

A beacon period can be calculated as the number N of available frequencies in the frequency hopping sequence multiplied by the radio period, plus the beacon listening time. Thus, a beacon period represents the time required to switch through each of the N frequencies, prepare the radio, and listen at the beacon frequency long enough to detect a beacon message.

In summary, the beacon message broadcast during the contention-free beacon period permits other nodes within the communication system to determine that they have identified a correct frequency of the hopping sequence, as well as the channel and subchannel with which the master node is broadcasting. However, the nodes controlled by the master node also need to determine when to switch frequencies (i.e., synchronize their hop periods), since frequency switching must occur for all stations in the communication system at the same time. Synchronization information for synchronizing to a is hop period of the master node is not included in the beacon message. Rather, information pertinent to synchronizing is included in a sync message (i.e., Sync MSG).

(2) Sync MSG—Sync message 204 enhances the ability of a node to quickly synchronize to a communication system. Although a beacon period is only included in hop periods which have been designated to include a beacon (e.g., once every 8 hops), the sync message is included at the beginning of every hop period, regardless of whether a beacon message is broadcast within the hop period. A master node may only broadcast its contention-free beacon once every x (e.g., 8) hop periods to minimize its contention-free control of the communication medium. However, Sync message 204 contains pertinent information to allow nodes to sync to the master node, and this information can be broadcast on every hop so that nodes can update their hop interval times and adjust for drift. The sync message can also contain pertinent information concerning a contention-free outbound period during which a master node can broadcast information to all nodes of the communication system without contention.

When a beacon message has been located, nodes can identify which channel and frequency (i.e., hop number) the master node is currently on to aid in the synchronization process. The sync message is used to transmit a hop timer count which reflects a count remaining on a hop timer of the master node when it sets up the sync message. The hop timer tracks the time duration of a hop period. Based on the remaining count transmitted by the master node in the sync message, a node can subtract the appropriate count for processing and transmission delays, and then write the remainder into a hop timer register so that its hop timer interrupt will occur at approximately the same time that a hop timer interrupt occurs in the master node. This allows the node to synchronize its hop period to the hop period of the master node.

(3) OutBound—A master node can communicate messages to all nodes with which it is synchronized in a communication system during a contention-free outbound period 206. The outbound period 206 can be used by master nodes to off load any queued data without contention. This allows optimum transfer of data for the master node, and can be used for configurations where the master node is, for example, also the server in a LAN. The outbound period is of variable length as required. For example, this period can be expanded in hops which do not include a beacon period. A master node can be configured to transmit a maximum number of messages that can be transferred during this period, or any number of messages less than the maximum, with the minimum equal to 0.

(4) Time Bounded—An optional, contention-free, time bounded period 208 can support time bounded services.

The period of time represented by the beacon period, the sync message period, the outbound period and the optional time bounded period collectively represents a first period of time, referred to herein as a contention-free "A" period. The remaining portion of the hop period is a contention period during which nodes synchronized to one another within a communication system vie for access to the communication medium. This contention period is referred to herein as a "B" period which is initiated by what is referred to herein as a "start of B". During the contention period, nodes can contend for access to the communication medium using a contention protocol such as that described in commonly assigned U.S. Pat. No, 5,231,634, the disclosure of which is hereby incorporated by reference in its entirety.

(5) Start of B—A start of B message 210 is broadcast by the master node to announce the start of a "B period" to all nodes.

(6) B Period—A "B" Period 212 is a random access contention period during which the master node and all other nodes can communicate with one another.

Having discussed the contents of a hop period used by nodes to communicate in accordance with exemplary embodiments of the present invention, attention will now be directed to the scanning period. A scanning period corresponds to a period during which a node scans for a beacon to synchronize to a master node. A scanning period is also used to search for beacons to detect the existence of other nodes (i.e., of master station priority or alternate master station priority) transmitting beacons.

b. Scanning Period

A scanning period corresponds to the time a non-master node searches before determining that a master node does not exist. For example, when a master node sends a beacon at least once every 8 hops, nodes must locate a beacon within that period.

In a normal hopping sequence, a transition from one frequency to a next frequency occurs in a predetermined non-sequential order in accordance with exemplary embodiments. However, when a node is searching for a beacon, it will begin scanning with the current frequency it is on and go up in frequency in sequential order until the Nth frequency is scanned. The hopping sequence then wraps around to the first frequency and continues through the sequence of frequencies again.

c. Frequency Drifting

Hop timers included in the nodes are resynchronized every hop period to correct for errors associated with tolerances of the timing references for each node. Each hop period, synchronized counters may be off by several counts, and if nodes are not resynchronized often, they can drift. Because the nodes are resynchronized every hop period, frequency drifting is corrected in each hop period.

However, exemplary embodiments can also account for frequency drift at the beginning of each hop period. For example, the master node can delay sending the sync message for a predetermined period of time referred to herein as a drift period. The master node need not delay sending the beacon during hops which include a beacon period because it is not important for synchronized nodes to receive beacon messages. With the exception of the beacon, no data is sent at the beginning or end of a hop period within the drift period.

The drift period differs depending on the hop period length. In exemplary embodiments, sync messages can be missed for a maximum of 4 hop periods before a determination is made that synchronization has been lost. In this case, the error rate must be multiplied by 4. The result is multiplied by 2 to account for the master node being off by a gain of 100 parts per million (PPM) while the node is off by a loss of 100 PPMs, creating an error rate of approximately 0.08%.

d. Message Format

To provide communication between nodes using frequency hopping and synchronization, a protocol for transmitting data and other information can be established in accordance with the aforementioned U.S. Pat. No. 5,231, 634. In accordance with exemplary embodiments, data can be transmitted in frames, with different frame types being employed as necessary. Each frame can include a frame header, and additional remaining unused bits which are reserved and set to zero unless otherwise specified.

In accordance with exemplary embodiments, a standard frame header can be used on all frames with the exception of a beacon message. A standard frame header includes a flag to indicate the start of the frame, an identification code of a transmitting node (e.g., whether the node is a master station, alternate master station, or a low priority station) control information, (e.g., transmission power level, data compression technique, radio speed, and so forth), medium access control length (e.g., frame length from node/frame up to CRC), security information, and channel/subchannel. The node/frame type portion of the standard header can specify antenna diversity (i.e., indicating which antenna is to be used as the sending node), the node type (i.e., master station, alternate station or station) and the frame type. Different types of frames include a beacon frame, a resync frame, a resync acknowledgement frame, a sync frame, a request-to-send frame (RTS), a clear-to-send frame (CTS), a request media access frame (RMA), a medium access control acknowledgement frame (MACK), a logical link control acknowledgement frame (LACK), a data message frame, a wake-up message frame, and so forth.

Source and destination addresses for information included in the frame can be included in an extended header definition specified by the user. The standard frame header can include a header followed by a destination address and a source address.

A start of B message can be sent by a current master node to indicate the start of a contention period. Nodes must hear the message to participate in the contention period, and nodes, upon receiving this message, will use a slot definition and apply it to the current hop. The start of B message contains a field which defines the maximum time to wait for successive start of B messages on successive hops before starting contention without it.

A beacon message can be energy (e.g., a message) which is sent at the beginning of some hops by the master node. In an exemplary embodiment, the beacon message can be a relatively short message that is repeated several times. A beacon message can include a flag to indicate the start of the beacon message, a frame type indicator to confirm that a beacon message is being transmitted, a security identification of the master node sending the beacon message, the channel and subchannel of the master, a CRC portion and an ending flag.

A resync message can, in accordance with exemplary embodiments, have one of two versions. A first version is a broadcast message sent by a master in an outbound period to inform all nodes synchronized to the master node that a second master node has been located to which all other nodes should synchronize. This first version of the resync message requires no acknowledgement. A second version of the resync message can be a directed message from a node designated as an alternate master to a first master station node during the contention period to inform the first master station that a second master station node exists. The alternate master node sends information about the second master to the first master station node. Upon receipt of this information, the first master station sends a resync acknowledgement message to inform all nodes of the identity of the new master (i.e., the identity of either the first master node or the second master node, depending on a master resolution protocol). This message includes the medium access control extended information, the channel/subchannel of the new master, the hop number which serves as an index into the channel frequency table to find a sync message, a hop duration, CRC information and an ending flag.

A resync acknowledgement message is sent from a master node and broadcast to all stations. This acknowledgement message can be sent in response to a node sending a resync message to the master node, and it informs all nodes synchronized to the master node to resynchronize to a new master at the frequency specified in the message. Thus, a resync acknowledgement message includes an extended medium access control, a channel/subchannel of the new master, a sync hop number used to locate the sync message, a hop duration, a new master identification to which all communications should synchronize, a CRC portion and an ending flag.

The Sync message sent by a master node at the beginning of each hop period contains information for nodes to adjust their hop timer counters to maintain synchronization from hop to hop. A synchronization message includes an extended medium access control portion, a node name (e.g., ASCII) of the master node, a control portion for defining the hop (i.e., whether next hop will/will not contain beacon, whether hop is dedicated to searching, or whether regular hop), a hop number, a hop duration, a CRC portion and an ending flag.

3. Communication System Operation a. Initialization

In accordance with the present invention, exemplary embodiments include a step of initializing the communication system by synchronizing the nodes to a first node. Initialization of a node designated with a master station priority is relatively straightforward. When a node designated with a master station priority is requested to initialize, it immediately sets its hop timer and starts beaconing and sending sync messages. Because it is of the highest priority, it does not search for other nodes of master station priority before attempting to assume a role as a master node itself.

Non-master nodes (e.g., a low priority node or a node of alternate master station priority which is not currently operating as a master node) initialize by first scanning for a beacon during a scanning period. Depending on a configuration of the communication system, a node will scan for a beacon which matches a subset of its channel and subchannel (as well as any security identification information).

Because the detail regarding initialization of synchronization in a communication system, the searching for multiple master stations, the searching for multiple nodes (alternate stations) and the synchronization to a newly detected master station do not in and of themselves, constitute a portion of the present invention, and because such features are described in the aforementioned copending applications, further discussion of these features is unnecessary.

b. Medium Access Control Optimization

In a medium access control protocol as described in the '634 patent, access to a communications medium shared by multiple nodes is controlled by sensing a communication medium by a first node to determine if the communications medium is in use. If not, the first node transmits a request-to-send message that includes reservation duration information. The request-to-send message is received by a second node to which information is to be sent. Upon receiving the request-to-send message, the second node transmits a clear-to-send message which includes reservation duration information on behalf of the first node, after which the first node then transmits information to the second node.

A node which is transmitting data first calculates the amount of time (i.e., reservation time) the entire transmission process will take, and then selects a random "slot" time to begin the transmission. If the communication medium is clear, the sending node will transmit an RTS message, and then await receipt of a CTS frame from the receiving node. All nodes that receive either an RTS or a CTS will defer from contending for the time specified in either frame (i.e., both the RTS and CTS frames contain the reservation time) during typical operation.

Figure 3:
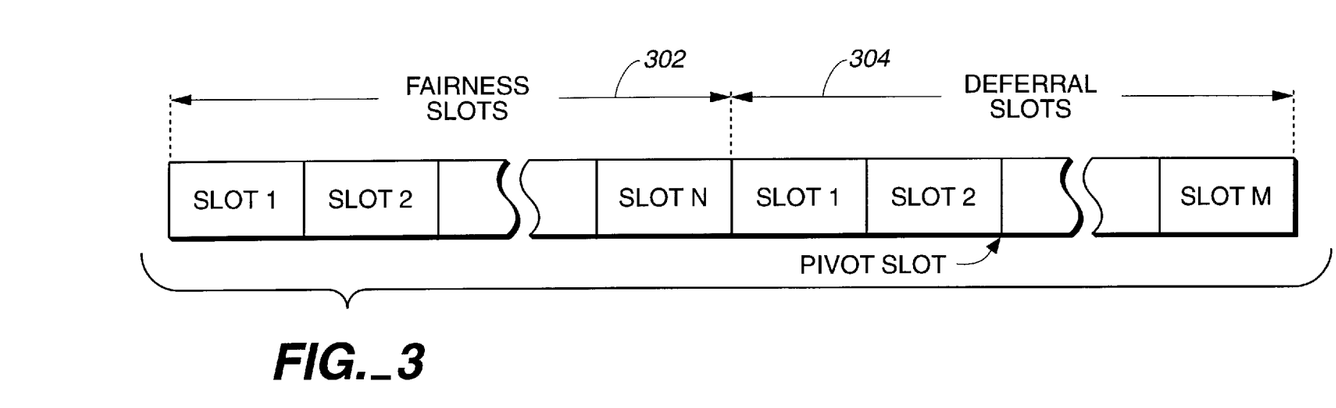
FIG. 3 shows an arrangement of a variable number of slots in a contention period with fairness.

As described in the '634 patent, to preserve fair access to the network, the contention time is broken into a fixed number of slots for which the nodes contend to obtain access to the wireless communication medium. For example, referring to FIG. 3 of the present application, the contention time is broken into two fixed periods: a fairness period 302 and a deferral period 304, both of which are divided into a fixed number of slots. The fairness period precedes the deferral period. Nodes in the fairness state select a random slot time to transmit in the fairness period, and nodes in the deferral state select a random slot time in the deferral period. A node which has won contention while in the fairness state will switch to the deferral state. Nodes in the deferral state which have not won contention will enter the fairness state.

In a communication system such as that described in the '634 patent, the number of deferral and fairness slots can significantly affect system throughput. As mentioned previously, in a system with a large number of wireless nodes contending for medium access at the same time, a larger number of fairness and deferral slots is desired, whereas fewer slots are desired when only one or two wireless nodes are contending for medium access.

For example, if node 102 of FIG. 1 is the only node wanting to send data at a given time, node 102 would have to choose a slot in the deferral period which is at least longer than the fairness period. Thus, if the fairness period was one slot, node 102 could transmit at a minimum of one slot time. If the fairness period was four slots, node 102 would have to wait at least four slot time periods. However, having one fairness slot would not work in a larger system. For example, if four nodes wanted access to the medium at the same time, and all ended up in the fairness period, all four would contend in the same slot and none of the four nodes would win contention. Consequently, none of the four nodes would be able to transmit data.

Accordingly, the present invention is directed to a method and apparatus for monitoring the number of wireless nodes in the communication system at any given time, and adjusting the number of slots accordingly. For example, where a communication system is configured with an access point to which all nodes in the system direct data, the access point can include a master station configured as described above. The access point can then monitor the number of data transmissions in a given time period. Based on this information, the master station can configure the number of deferral slots ("M" in FIG. 3) and/or the number of fairness slots ("N") in FIG. 3) through, for example, the Start of B message.

In an access point communication system, where all nodes communicate through an "access point" (AP), a node which wishes to transmit data over the communication system will send a packet to the access point with its "source" address included. The access point creates a linked list of different "source" nodes from which it receives a packet. This list is sorted by, for example, a timestamp associated with the time at which the packet was received. Therefore, to find out if there was more than one node transmitting in the last two seconds, the access point would examine the timestamp of the second element in the linked list to see if it was within the last two seconds. Further, if there were eight elements in the list, the access point can determine if there were at least eight nodes communicating within the last five seconds by examining the timestamp of the last element to see if it occurred within the last five seconds. This information can then be used to automatically adjust the number of fairness and/or deferral slots.

As those skilled in the art will appreciate, the number of nodes currently active in a communication system (i.e., over a predetermined period of time), can be evaluated in any known fashion to reevaluate the number of slots. For example, the number of slots which provide optimum throughput can be determined for each of a different number of nodes in the communication system. This information can then be stored in the access point. Subsequently, the access point can determine the number of nodes currently active in the communication system over a current predetermined period of time, and using the information stored in the access point, reset the number of slots for the next predetermined period of time based on conditions in the current period of time. The period of time during which data transmissions are monitored can be set by the user.

Figure 4:
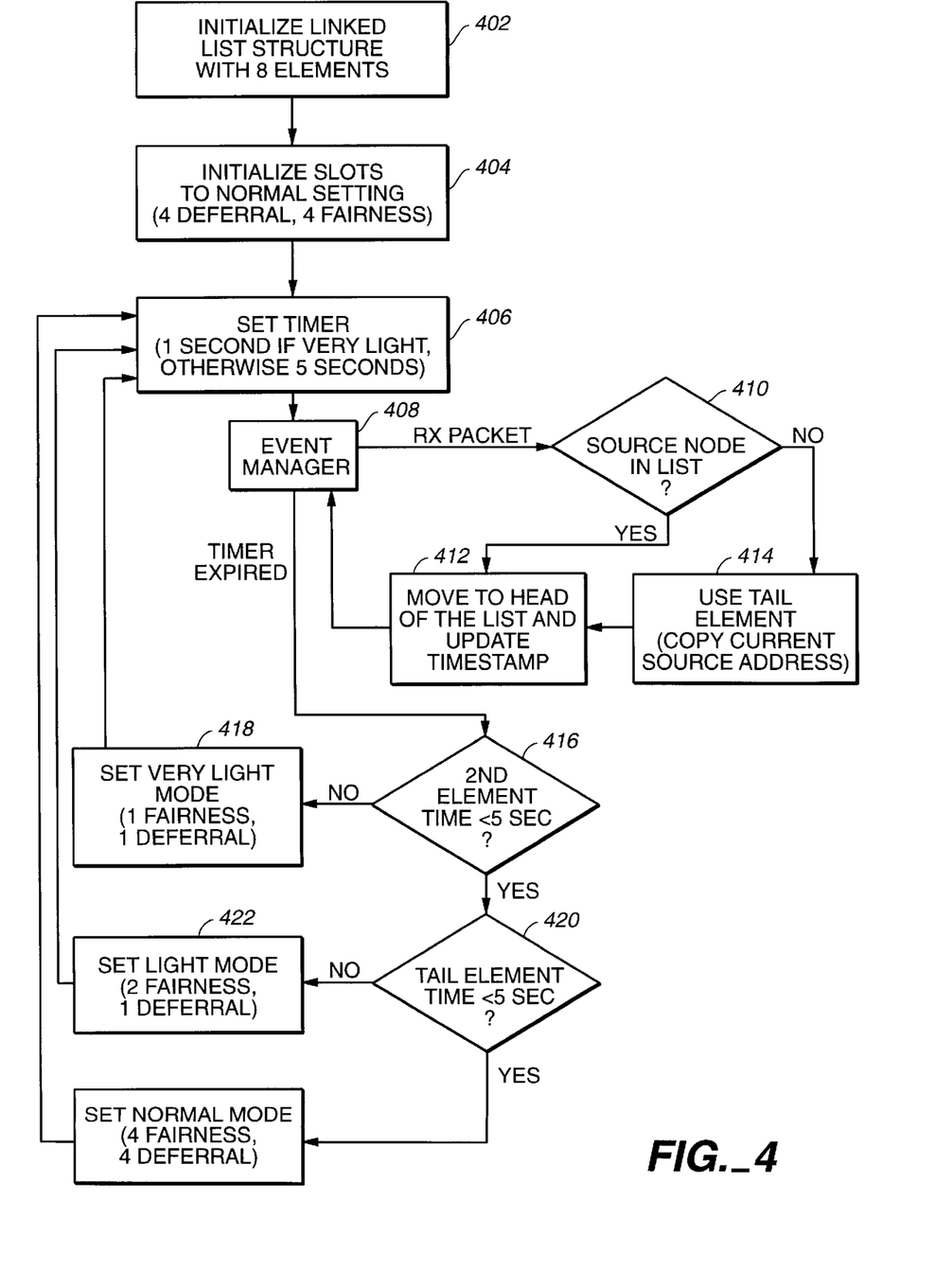
FIG. 4 shows a flowchart of operation in accordance with an exemplary embodiment of the invention.

FIG. 4 illustrates operation in accordance with an exemplary embodiment. In step 402, a linked list structure having a predetermined number of elements (e.g., eight elements in an exemplary embodiment) is initialized. This list is used to store the timestamps associated with the predetermined number of source nodes active within the predetermined time. For purposes of the following discussion, a maximum number of slots will be used when at least eight source nodes are active in the communication system over a five second period.

In step 404, the maximum number of slots (e.g., eight) are initialized to a normal setting. This normal setting can, for example, be four deferral slots and four fairness slots.

In step 406, a timer used to monitor expiration of the predetermined period of time is set. The predetermined period of time can, for example, be a variable period which is set on the basis of current activity. For example, the predetermined period of time can be reduced to one second if activity within the communication system is relatively light as determined by the number of timestamps included in the linked list during the originally set five second period. Alternately, if activity in the communication system is subsequently determined to be heavy (as reflected, for example, by examining the timestamp of the tail element in the list to determine if it occurred within the last five seconds), then the timer period can be returned to its original value (i.e., five seconds). Of course, any number of different predetermined periods of time can be used, with the predetermined periods of time being selected based on current activity in the communication system.

In step 408, an event manager (which can be configured as a processor within the access point) monitors source node activity within the predetermined period of time. In step 410, the event manager determines whether a currently received packet of information corresponds to a source node already included in the linked list. If so, the event manager moves the source node to the head of the linked list in block 412, and updates the timestamp associated with the receipt of that data packet. Alternately, if the source node is not already in the linked list, then it is stored in the tail element of the linked list by, for example, copying the source node address and the timestamp associated with receipt of that packet in block 414. The event manager then moves the tail element to the head of the linked list in block 412. For example, if a ninth packet is detected, it replaces the tail element in block 414, and the tail element is then moved to the head of the list in block 412, since it constitutes the most recently received data.

To set the number of slots used by the communication system, the event manager performs a sequence of steps during the expiration of each predetermined period of time. More particularly, in decision block 416, the event manager determines whether a second element in the linked list was introduced to the linked list structure within the last five seconds. If not, the event manager can determine that the communications system is operating at a very light level of operation, and can reduce the number of slots to the minimum via step 418. In an exemplary embodiment, a minimum number of slots is used when less than two active source nodes exist in the communication system over the predetermined period of time (e.g., one fairness slot and one deferral slot).

An alternate branch of decision block 416 occurs if a second source node element was active within the five second predetermined period of time. In this case, decision block 420 determines whether a tail element of the linked list occurred within the last five seconds. If not, then operation proceeds to block 422, wherein a light mode of operation is determined to exist, such that an intermediate number of slots is selected for use in the communication system. In an exemplary embodiment, three such slots are used (e.g., two fairness slots and one deferral slot).

An alternate branch from decision block 420 occurs if the tail element of the linked list structure did occur within the last five seconds. In this case, the maximum number of slots are set to initiate a normal mode of operation (e.g., eight slots, four of which are fairness slots and four of which are deferral slots).

Thus, the number of slots can be configured as follows: (1) if the access point detects no more than two active nodes in the predetermined period of time, two slots (i.e., one fairness slot and one deferral slot) can be used; (2) if the access point sees eight or less active nodes, three slots can be used (i.e., two fairness slots and one deferral slot); and (3) if the access points sees eight or more active nodes, eight slots can be used (i.e., four fairness slots and four deferral slots). Of course, any number of slots can be used in conjunction with exemplary embodiments of the present invention. Further, any criteria can be used to set the number of slots associated with a given activity level in the communication system.

As those skilled in the art will appreciate, the categories of activity used to define the number of slots will necessarily be a function of the predetermined time over which communication system activity is monitored. Accordingly, an empirical approach can be used to determine an appropriate period of time over which to monitor activity so that the different categories of slots used will have a meaningful effect on system throughput.

While the foregoing discussion has focussed on the monitoring of actual data transmissions in a predetermined period of time to measure communication system activity and dynamically set the number of slots used, those skilled in the art will appreciate that numerous variations exist. For example, rather than monitoring data transmissions through a central point of a communication system, such as an access point that bridges two different types of communication mediums (e.g., a wireless medium and a wired medium), any information which swerves as an indication of communication system activity can be used. For example, rather than monitoring actual data transmission, the request-to-send messages can be monitored and used to adjust the number of slots. The monitoring of RTS messages avoids the need to include an access point through which all data transmissions occur in the communication system.

Further, those skilled in the art will appreciate that the number of slots used can be set as desired by the user. Further, while both fairness and deferral slots as described in the '634 patent have been incorporated in the discussion of an exemplary embodiment of the present invention, those skilled in the art will appreciate that a distinction between fairness and deferral slots is unnecessary. That is, the number of slots used, regardless of whether they are fairness or deferral slots can be dynamically adjusted. Further, where fairness and deferral slots such as those described in the '634 patent are used, a ratio of 1:1 between these different category slots need not be maintained. Rather, the ratio of fairness slots to deferral slots can be dynamically adjusted either as the sole dynamic adjustment, or in combination with an adjustment to the total number of slots.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. Apparatus for controlling wireless communication among plural nodes in a frequency hopping communication system comprising:

means for monitoring a number of transmissions which occur within the communication system, said means for monitoring including maintaining a linked list of nodes which have transmitted information within a predetermined period of time; and means for dynamically changing a number of slots for which nodes of the communication system contend for access to a wireless communication medium of the communication system, said dynamic changing being performed as a function of said number of monitored transmissions, wherein said linked list includes timestamp information regarding a time at which each of said nodes transmitted information, said linked list being sorted according to said timestamps.

2. Apparatus according to claim 1, wherein said monitoring means detects a number of data packet transmissions sent within a predetermined period of time.

3. Apparatus according to claim 1, wherein said monitoring means detects a number of request-to-send messages sent within a predetermined period of time.

4. Apparatus according to claim 1, wherein said means for dynamically changing is performed as a function of said number of monitored transmissions received in a predetermined period of time, said predetermined period of time being variable based on activity of the communication system.

5. Method for controlling wireless communication among plural nodes in a communication system, comprising the steps of:

monitoring a number of transmissions which occur within the communication system by maintaining a linked list of nodes which have transmitted information within a predetermined period of time; and dynamically changing a number of slots for which nodes of the communication system contend for access to a wireless communication medium of the communication system, said step of dynamically changing being performed as a function of said number of monitored transmissions, said linked list including timestamp information regarding a time at which each of said nodes transmitted information, said linked list being sorted according to said timestamps.

* * * * *